United States Patent
Swinyard (10) Patent No.: US 12,207,597 B2
(45) Date of Patent: Jan. 28, 2025

(54) TIMBER-WORKING DEVICES

(71) Applicant: Deere & Company, Moline, IL (US)

(72) Inventor: Douglas Craig Swinyard, Tokoroa (NZ)

(73) Assignee: DEERE & COMPANY, Moline, IL (US)

( * ) Notice: Subject to any disclaimer, the term of this patent is extended or adjusted under 35 U.S.C. 154(b) by 243 days.

(21) Appl. No.: 17/844,444

(22) Filed: Jun. 20, 2022

(65) Prior Publication Data

US 2022/0400629 A1      Dec. 22, 2022

(51) Int. Cl.
*A01G 23/091*      (2006.01)
*B25J 9/06*      (2006.01)

(52) U.S. Cl.
CPC .............. *A01G 23/091* (2013.01); *B25J 9/06* (2013.01)

(58) Field of Classification Search
CPC ... A01G 23/083; A01G 23/091; A01G 23/095
See application file for complete search history.

(56) References Cited

U.S. PATENT DOCUMENTS

| | | | | |
|---|---|---|---|---|
| 7,677,279 | B2 * | 3/2010 | Swinyard | A01G 23/083 144/24.13 |
| 10,238,045 | B2 * | 3/2019 | Boys | A01G 23/083 |
| 11,051,465 | B2 * | 7/2021 | Matsumoto | A01G 23/095 |
| 11,134,623 | B2 * | 10/2021 | Ketonen | A01G 23/095 |

FOREIGN PATENT DOCUMENTS

FI      120951 B1 *  5/2010

* cited by examiner

*Primary Examiner* — Matthew Katcoff
(74) *Attorney, Agent, or Firm* — KLINTWORTH & ROZENBLAT IP LLP (57) ABSTRACT

A timber-working device has a frame, and a saw apparatus mounted to the frame. At least one pair of arms are pivotally attached to the frame and configured to be controlled to grasp at least one tree stem. A feed mechanism is configured to feed the at least one stem relative to the frame. The feed mechanism has opposing feed arms, each feed arm pivotally connected to the frame. Each feed arm has a pivot pin arrangement with a first pivot pin and a second pivot pin, where the first pivot pin and the second pivot pin are aligned along a common longitudinal axis. An air gap is provided between the between the first pivot pin and the second pivot pin along the common longitudinal axis.

18 Claims, 7 Drawing Sheets

TIMBER-WORKING DEVICES

CROSS-REFERENCE TO RELATED APPLICATIONS

This application claims priority to New Zealand Application No. 777065, filed Jun. 21, 2021, the entire contents of which are incorporated herein by reference.

STATEMENT OF FEDERALLY SPONSORED RESEARCH AND DEVELOPMENT

Not applicable.

FIELD OF THE DISCLOSURE

The present disclosure relates to timber-working devices, more particularly devices to be mounted to a mobile work machine for the felling and/or processing of trees.

BACKGROUND OF THE DISCLOSURE

It is known to mount a timber-working head, for example in the form of a harvesting head, to a mobile forestry work machine to perform a number of functions in connection with timber. Such heads, depending on the configuration, may be used to grapple and fell a standing tree, process the felled tree by delimbing and possibly debarking the stem, and cutting the stem into lengths using at least one chainsaw.

Harvester heads typically have delimb arms and/or feed arms for grasping and feeding a tree or stem. The arms are able to mechanically open and close, and can be timed to open symmetrically by means of a timing link that attaches between the arms. Each feed arm typically houses a feed wheel attached to a motor, providing the propulsion for the stem when it is grasped in the head. The motor is typically hydraulic and requires connection to a main valve by means of hosing. In allowing for the full range of arm movement this can create a large exposed hose loop when the feed arms are open. This hose loop is prone to snagging when the head is used in a harvesting application, leading to down time from broken hoses or fittings, and costs in replacing same.

Further, the timing link which operates between the two arms is heavy and applies a great deal of loading to the pins supporting it. This particularly occurs in the harvesting orientation (i.e. when the head is upright in order to grapple a standing tree), when the majority of the weight of the link is over one side of the pins. The loading in turn creates accelerated wear to the pins and their supporting bores.

Additional, pins on the head are typically greased to prevent moving parts from applying rotational loading to the pins. There are situations however that allow for the pins to be forced to rotate, thus spreading the locking tabs of pin keepers used to locate the pins. When this happens the pin is able to walk out of its hole causing components of the head to become loose, or fall out, and this results in down time.

It is an object of the present invention to address one or more of the foregoing problems or at least to provide the public with a useful choice.

Further aspects and advantages of the present invention will become apparent from the ensuing description which is given by way of example only.

SUMMARY OF THE DISCLOSURE

According to an exemplary embodiment of the present disclosure there is provided a timber-working device, comprising a frame, and a saw apparatus mounted to the frame. The timber-working device may comprise at least one pair of arms pivotally attached to the frame and configured to be controlled to grasp at least one tree stem. The timber-working device may comprise a feed mechanism configured to feed the at least one stem relative to the frame.

In examples the feed mechanism comprises opposing feed arms, each feed arm pivotally connected to the frame. In examples, each feed arm comprises a pivot pin arrangement, comprising: a first pivot pin; a second pivot pin; wherein the first pivot pin and the second pivot pin are aligned along a common longitudinal axis; and wherein an air gap is provided between the between the first pivot pin and the second pivot pin along the common longitudinal axis.

In examples, each feed arm comprises a feed arm frame comprising a first pivot pin mounting portion and a second pivot pin mounting portion. In examples, the feed arm frame comprises a motor mounting portion. In examples the feed arm frame comprises a first side portion between the motor mounting portion and the first pivot pin mounting portion, and a second side portion between the motor mounting portion and the second pivot pin mounting portion. In examples the feed arm frame comprises a posterior portion between the motor mounting portion, the first side portion, and the second side portion.

In examples, the feed arm frame comprises a superior bridge portion between the first pivot pin mounting portion and the second pivot pin mounting portion. In examples the superior bridge portion is provided on an anterior side of the first pivot pin mounting portion and the second pivot pin mounting portion.

In examples, the feed arm frame comprises a bracing bridge portion between the first side portion and the second side portion, provided inferior to the first pivot pin mounting portion and a second pivot pin mounting portion. In an example the bracing bridge portion comprises a bent plate extending from the posterior portion in an anterior direction, and bending in an inferior direction.

In examples, the feed arm frame comprises at least one gusset portion between the superior bridge portion and the first pivot pin mounting portion and the second pivot pin mounting portion, respectively. In examples, the gusset portions are offset from the first side portion and the second side portion, respectively.

In examples, the feed arm frame comprises at least one doubler portion across the air gap. In examples the feed arm frame comprises a first doubler portion on the posterior portion. In examples the feed arm frame comprises a second doubler portion on the superior bridge portion.

In examples, the feed arm frame comprises a superior strong-back portion between the superior bridge portion, the first side portion, and the second side portion. In examples the superior strong-back portion is perpendicular to the superior bridge portion.

In examples, the feed arm frame comprises an inferior strong-back portion between the motor mounting portion, the first side portion, and the second side portion. In examples the inferior strong-back portion is perpendicular to the motor mounting portion.

In examples, the timber-working device may comprise at least one pin retention assembly, comprising a pin retainer configured to retain a pin inserted through a structural member.

In examples the pin comprises a first locating feature recessed into a first side of the pin, and a second locating feature recessed into a second side of the pin opposite the first side. In examples, each locating feature comprises a straight planar surface. In examples the pin retainer comprises a first leg and a second leg, defining a slot therebetween, wherein the pin retainer is configured to be slid relative to the pin such that in use the first leg is positioned in the first locating feature and the second leg is positioned in the second locating feature. In examples the pin retainer is fastened to the structural member—for example using at least one bolt.

In examples the pin retention assembly comprises a locating recess in the structural member, wherein the pin retainer is disposed within the locating recess such that an outer side surface of each leg is proximal a respective recess side surface of the locating recess, wherein the outer side surface at least partially overlaps the recess side surface.

In examples, the timber-working device may comprise a timing link between the arms of the pair of arms. In examples, the timber-working device may comprise at least one support member between the frame and the timing link.

In examples, the at least one support member may be provided on a first wall of the frame, wherein the first wall of the frame is substantially perpendicular to a surface of the timing link in contact with the support member. In alternative examples, the at least one support member may be provided on a second wall of the frame, wherein the second wall of the frame is substantially parallel to a surface of the timing link in contact with the support member.

In examples, the at least one support member may be inferior to the timing link when the timber-working device is in a harvesting orientation.

In examples, the at least one support member may be made of a plastics material. For example, the at least one support member may be made of a nylon material.

The above and other features will become apparent from the following description and the attached drawings.

BRIEF DESCRIPTION OF DRAWINGS

The detailed description of the drawings refers to the accompanying figures in which.

DETAILED DESCRIPTION

Figure 1:
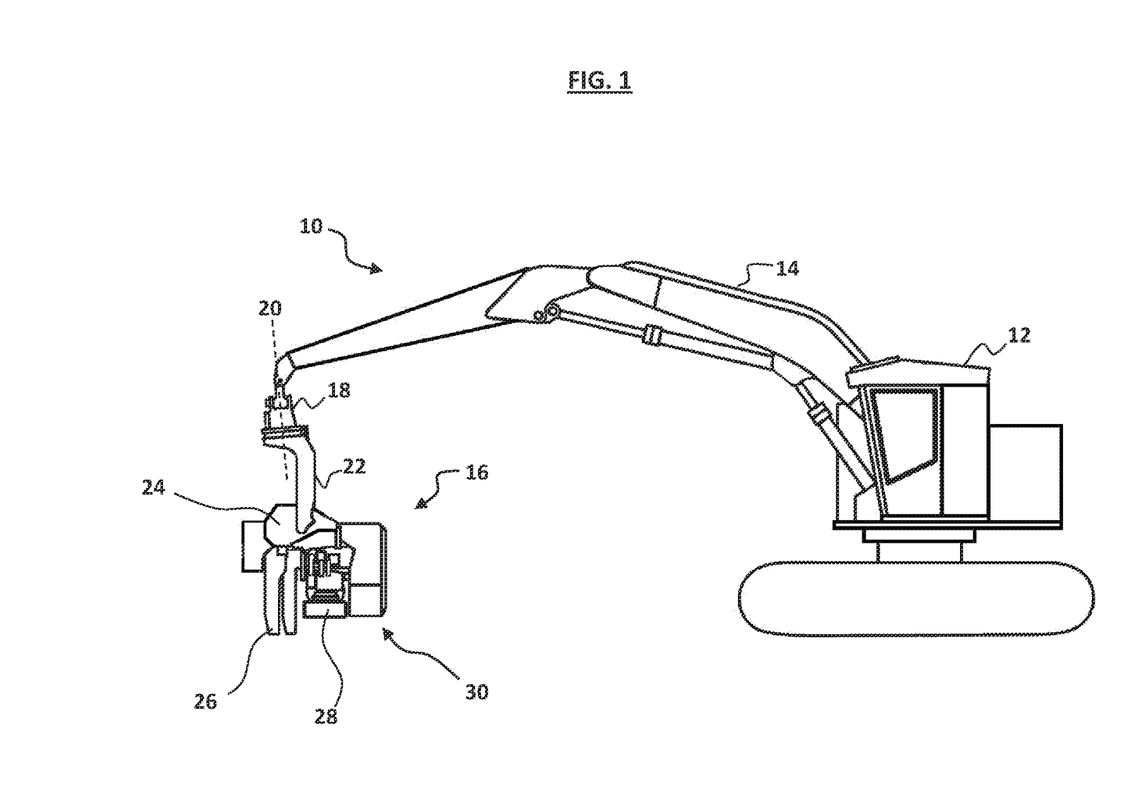
FIG. 1 is a side view of an exemplary timber-working system comprising an exemplary forestry head.

FIG. 1 illustrates a timber-working system comprising a carrier 10 for use in forest harvesting. The carrier 10 comprises an operator cab 12 from which an operator (not shown) controls the carrier 10. The carrier 10 further comprises a boom assembly 14, to which a timber-working device in the form of a forestry head 16 is connected.

Connection of the head 16 to the boom assembly 14 comprises a rotator 18, configured to rotate the head 16 about the generally vertical axis of rotation marked by dashed line 20. A tilt bracket 22 further allows rotation of the head 16 between a prone position (as illustrated) and a standing position.

The head 16 comprises a frame 24 to which the tilt bracket 22 is pivotally attached. Right hand (RH) and left hand (LH) delimb arms 26 are pivotally attached to the frame 24, as are opposing RH and LH feed arms 28. RH and LH feed wheels 30 are attached to the respective RH and LH feed arms 28, which together with RH and LH frame-mounted feed wheels may be controlled to feed one or more stems (not illustrated) along a longitudinal feed axis of the head 16. It should be appreciated that while the head 16 is described as having two frame-mounted feed wheels, in exemplary embodiments the head may have one frame-mounted feed wheel, or none, as known in the art. The arm and frame mounted feed wheels may collectively be referred to as the 'feed mechanism.' It should be appreciated that reference to the feed wheels is intended to comprise the hydraulic rotary drives propelling them. A measuring wheel may be used to measure the length of the stem as it passes.

Saw apparatus in the form of a main chainsaw 30 is attached to the frame 24. In examples, a topping chainsaw may be provided at the other end of the head 16. The main saw 30 is typically used to fell a tree when the head 16 is in a harvesting position, and to buck stems into logs in the processing position of the head 16. The topping saw may be used to cut off a small-diameter top portion of the stem(s) to maximize the value recovery of the trees.

Figure 2A:
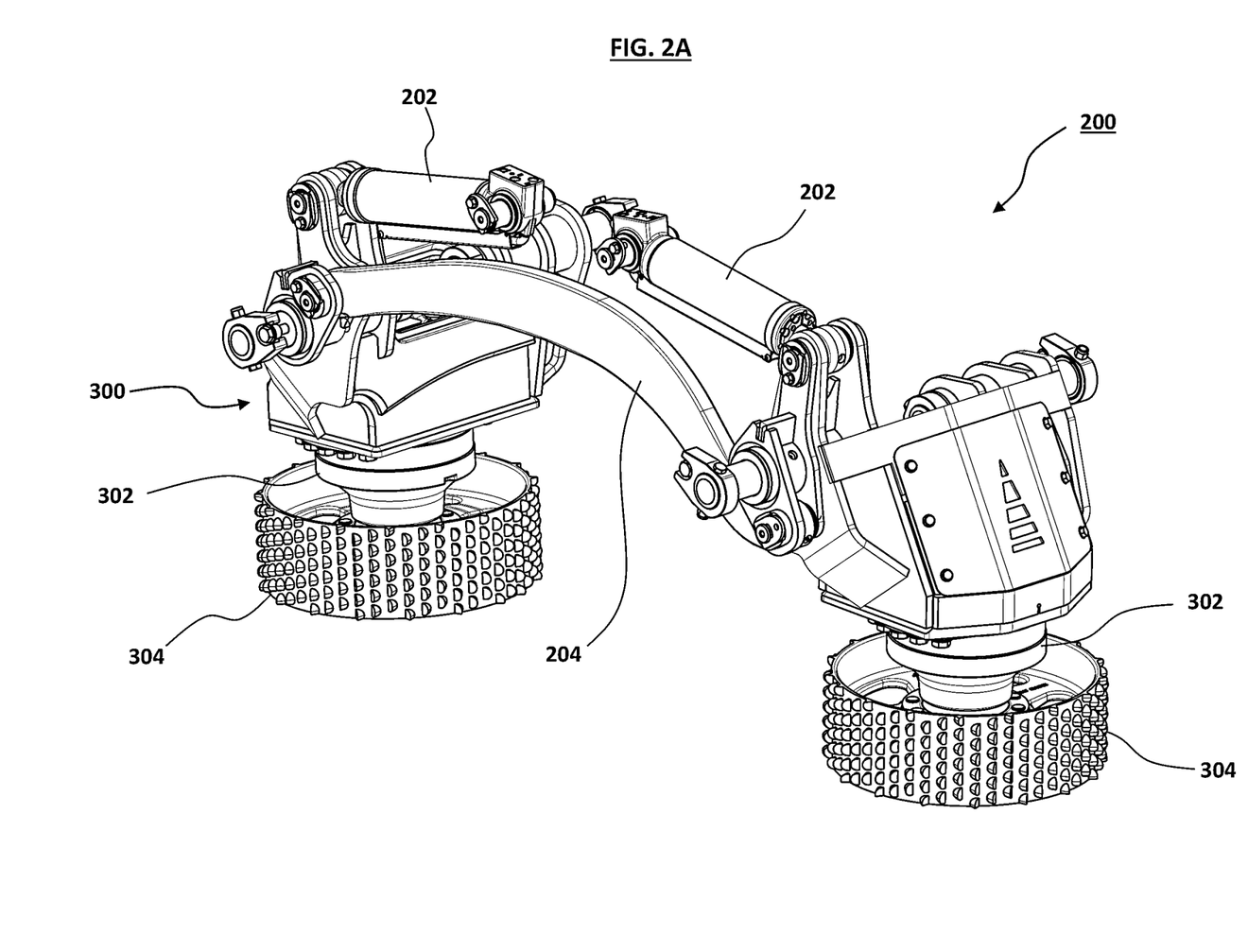
FIG. 2A is a perspective view of an exemplary feed mechanism of the forestry head.

FIG. 2A shows an exemplary feed arm arrangement 200, comprising LH and RH feed arms 300, each having a hydraulic motor 302 to which feed wheels 304 are mounted. The LH and RH feed arms 300 are driven by hydraulic actuators 202 to close and open in order to grasp and release a tree stem being felled and/or processed. The LH and RH feed arms 300 are interconnected by timing link 204, which acts as a physical guide to assist in having the LH and RH feed arms 300 open and close at similar rate.

Figure 2B:
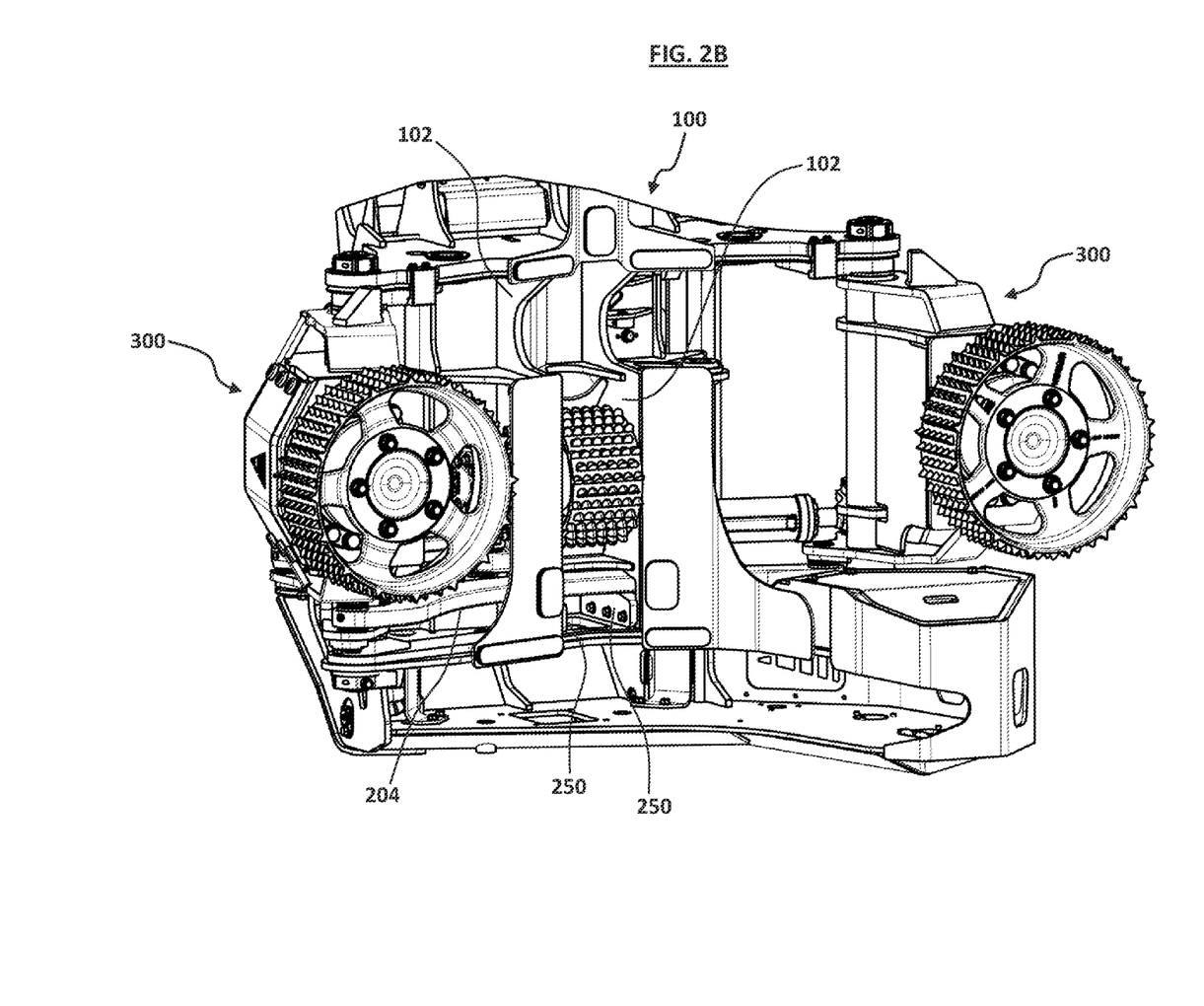
FIG. 2B is a perspective view of a portion of the forestry head comprising frame mounted support members.

Referring to FIG. 2B, a frame 100 of the head comprises longitudinal walls 102 extending along the feed axis of the head—i.e. perpendicular to the timing link 204. In examples, support members in the form of nylon guide blocks 250 are secured to the longitudinal walls 102 in a position inferior to the timing link 204 when the feed arm arrangement 200 is tilted into a harvesting/felling orientation, as shown.

Figure 2C:
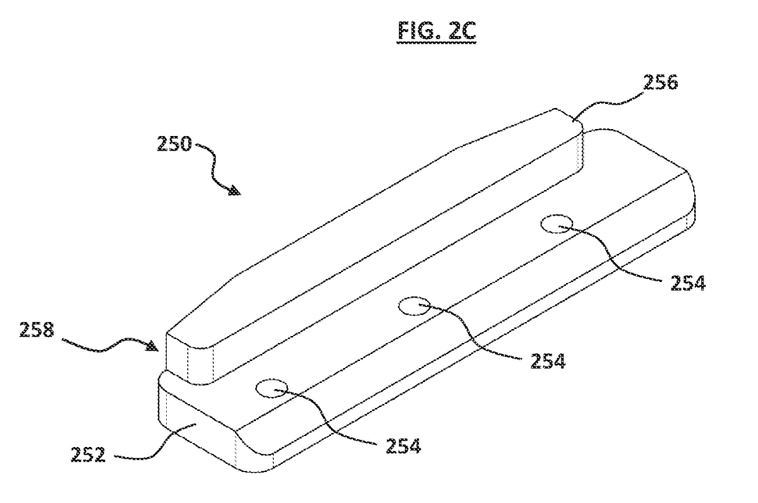
FIG. 2C is a perspective view of an exemplary support member for a timing link.

As shown in FIG. 2C, the nylon guide block 250 comprises a main body 252, having a plurality of fastener holes 254 through which fasteners (e.g. bolts) may be passed in order to secure the nylon guide block 250 to the longitudinal wall 102. In this example, a lip 256 extends from the main body 252, such that in use the lip 256 overhangs heads of the fasteners, and increases the surface area of support surface 258 against which the timing link 204 bears.

Figure 3A:
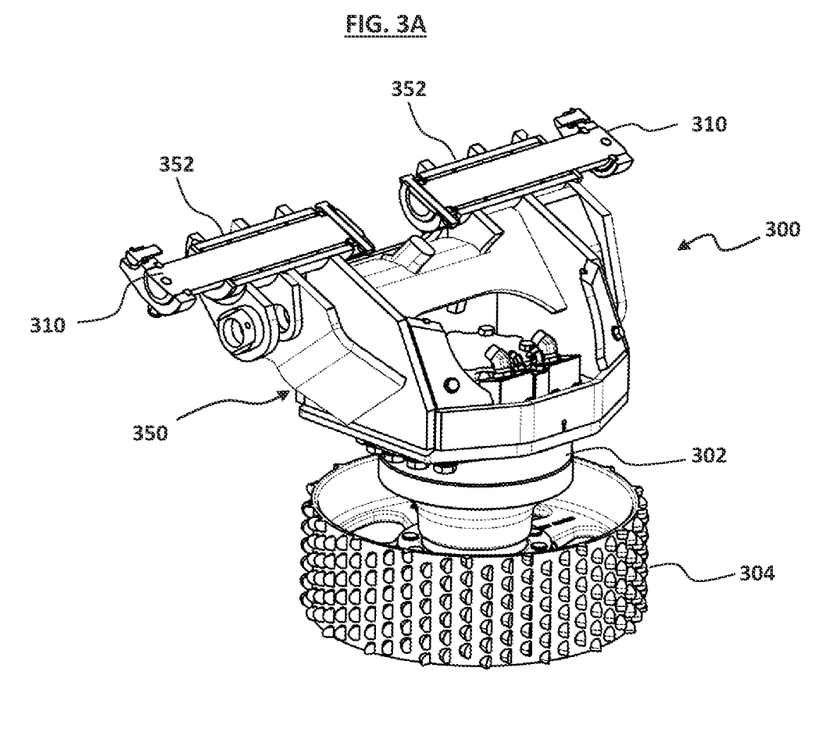
FIG. 3A is a perspective view of an exemplary feed arm of the forestry head, comprising a cutaway portion through pivot pins of the feed arm.
Figure 3B:
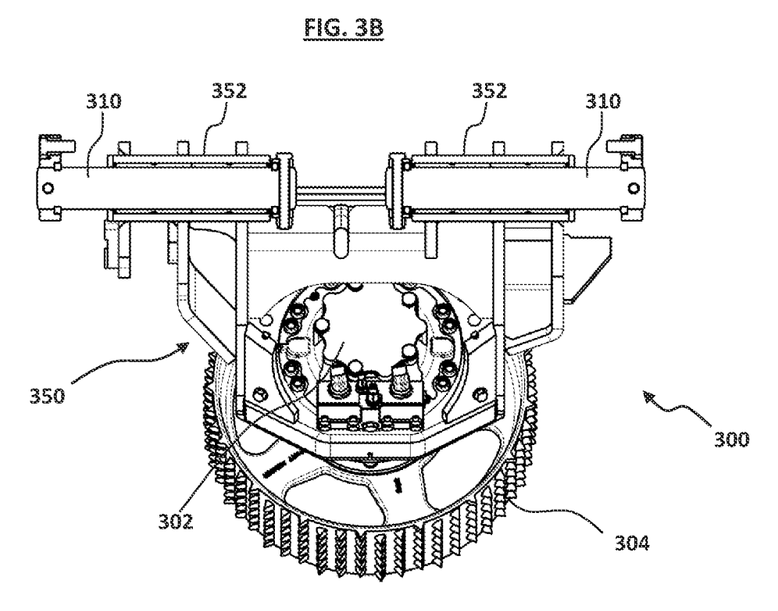
FIG. 3B is a top view of the exemplary feed arm.

Referring to FIGS. 3A and 3B, each feed arm 300 comprises a feed arm frame 350 having a first pivot pin mounting portion and a second pivot pin mounting portion in the form of pin barrels 352. First and second pivot pins 310 are received in the respective barrels 352, aligned along a common longitudinal axis. An air gap is provided between the between the pivot pins 310 along the common longitudinal axis. Hoses and/or cables between the motor 302 and the frame 100 (or components mounted thereto) may pass through this air gap, reducing the length required—and therefore exposure during operation which may otherwise be vulnerable to damage.

Figure 3C:
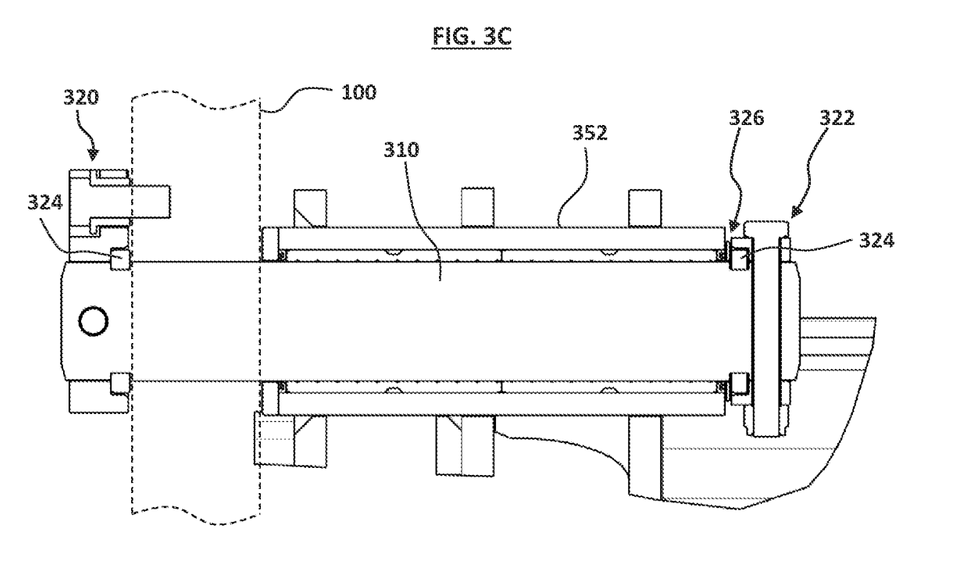
FIG. 3C is a cross-sectional view of a pin mounting portion of the feed arm.

Referring to FIG. 3C, each pivot pin 310 is held relative to the frame 100 using a first pivot pin retainer 320, and a second pivot pin retainer 322 is provided at a distal end of the pin barrel 352. C-clips 324 inside the pin retainers 320 and 322, respectively, prevent longitudinal movement—with shims 326 taking up any excess play. In use, the pivot pin 310 remains stationary relative to the frame 100, while the pin barrel 352 rotates about the pivot pin 310.

Figure 3D:
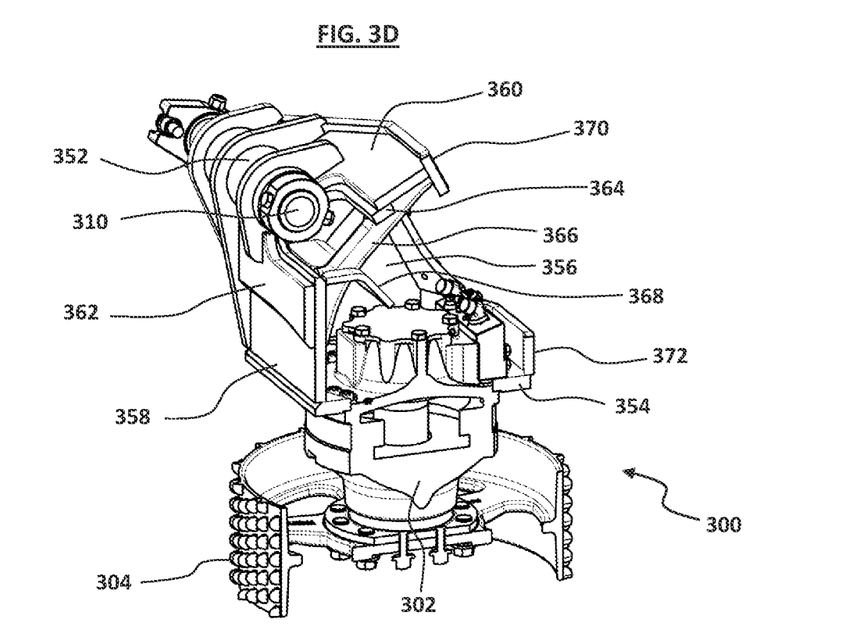
FIG. 3D is a first perspective cross-sectional view of the exemplary feed arm.
Figure 3E:
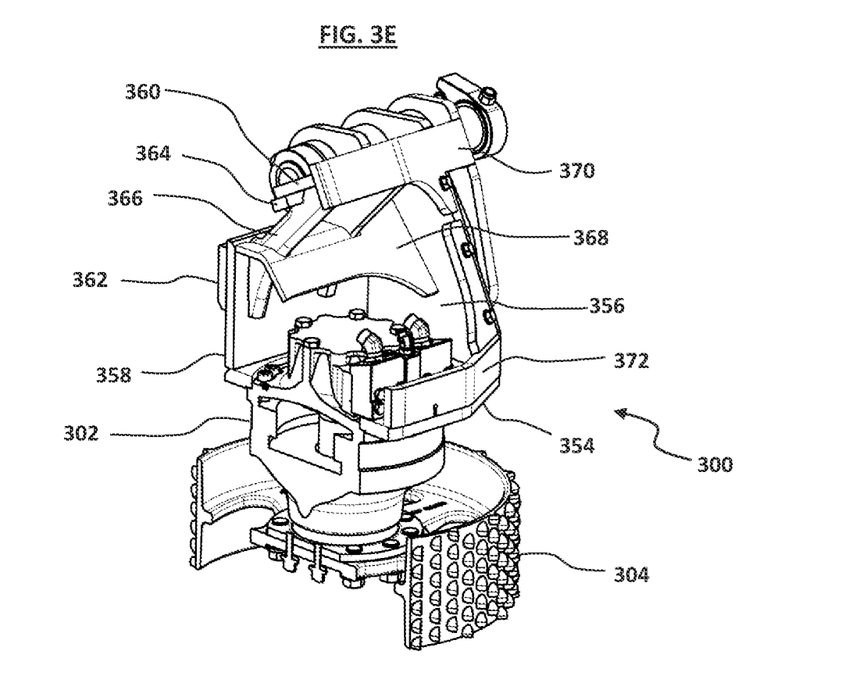
FIG. 3E is a second perspective cross-sectional view of the exemplary feed arm.

Referring to FIGS. 3D and 3E, the feed arm frame 350 comprises a motor mounting portion 354 to which the motor 302 is mounted. The feed arm frame 350 further comprises a first side portion 356 between the motor mounting portion 354 and the first pin barrel 352, and a second side portion (not shown in FIG. 3D or FIG. 3E) between the motor mounting portion 354 and the second pin barrel 352. The feed arm frame 350 further comprises a posterior portion 358 between the motor mounting portion 354, and the side portions 356. A superior bridge portion 360 extends between the pin barrels 352, on their anterior side. In the exemplary embodiment illustrated, the feed arm frame 350 comprises a first doubler portion 362 on the posterior portion 358, and a second doubler portion 364 on the superior bridge portion 360.

The feed arm frame 350 further comprises gusset portions 366 between the superior bridge portion 360 and the respective pin barrels 352, offset from the respective side portions 356. A bracing bridge portion 368 is provided between the side portions 356, inferior to the pin barrels 352. The bracing bridge portion 368 comprises a bent plate extending from the posterior portion 358 in an anterior direction, and bending in an inferior direction.

The feed arm frame 350 further comprises a superior strong-back portion 370 between the superior bridge portion 360 and the side portions 356. The superior strong-back portion 370 is perpendicular to the superior bridge portion 360. An inferior strong-back portion 372 is provided between the motor mounting portion 354 and the side portions 356. The inferior strong-back portion 372 is perpendicular to the motor mounting portion 354.

Figure 4A:
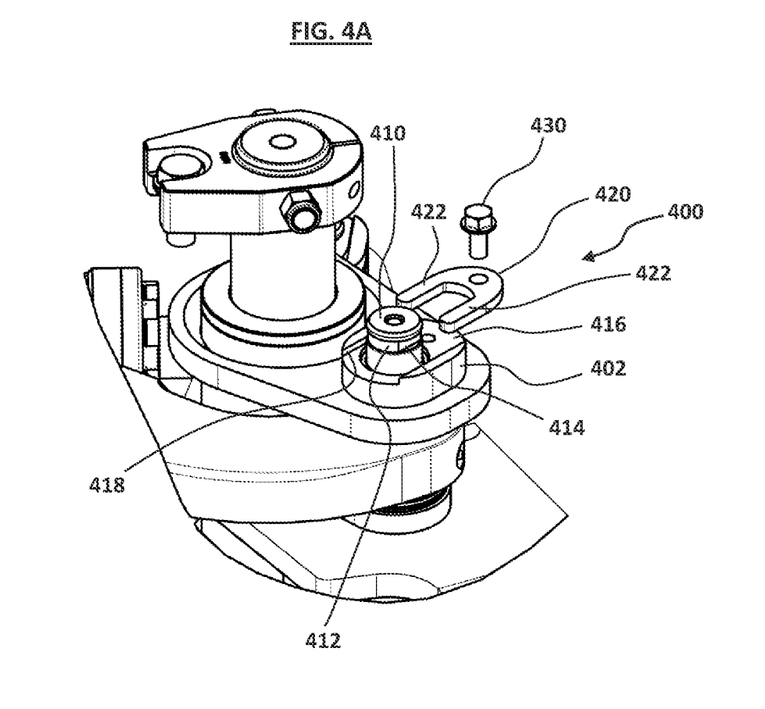
FIG. 4A is a perspective view of an exemplary pin retention assembly in a disassembled condition.
Figure 4B:
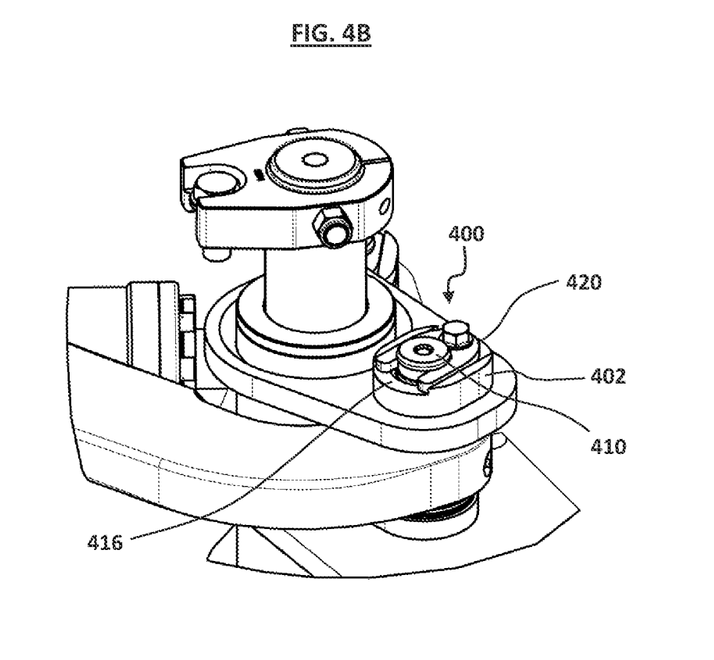
FIG. 4B is a perspective view of the pin retention assembly in an assembled condition.

FIG. 4A and FIG. 4B illustrate an exemplary pin retention assembly 400, which in use retains a pin 410 inserted through a structural member 402. In the illustrated example, the pin 410 comprises an annular retention groove 412, having locating features in the form of a straight planar surface 414 on opposing sides of the pin 410. The pin retention assembly 400 comprises a pin retainer 420 having first and second legs 422 defining a slot therebetween. The pin retainer 420 is configured to be slid relative to the pin 410 such that in use the first leg 422 is positioned in the first locating feature 414 and the second leg 422 is positioned in the second locating feature 414.

The pin retention assembly 400 comprises a locating recess 416 in the structural member 402, the locating recess 416 having inwardly facing planar side surfaces 418. The pin retainer 420 is disposed within the locating recess 416 such that an outer side surface of each leg 422 is proximal a respective side surface 418 of the locating recess 416, wherein the outer side surface of each leg 422 at least partially overlaps the recess side surface 418. The pin retainer 420 is fastened to the structural member 402—in this example using at least one bolt 430. In use, the overlap between the outer side surface of each leg 422 and the recess side surfaces 418 prevents the pin keeper legs 422 from spreading under rotational loading from the pin 410, reducing the likelihood of failure.

No admission is made that any reference disclosed herein constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the field of endeavour, in New Zealand or in any other country.

Throughout this specification, the word "comprise" or "include", or variations thereof such as "comprises", "includes", "comprising" or "including" will be understood to imply the inclusion of a stated element, integer or step, or group of elements integers or steps, but not the exclusion of any other element, integer or step, or group of elements, integers or steps.

Embodiments described herein may also be said broadly to consist in the parts, elements and features referred to or indicated in the specification of the application, individually or collectively, in any or all combinations of two or more of said parts, elements or features.

Where in the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the scope of the disclosure and without diminishing its attendant advantages. It is therefore intended that such changes and modifications be included within the present invention.

Embodiments have been described by way of example only and it should be appreciated that modifications and additions may be made thereto without departing from the scope thereof.

What is claimed is:

1. A timber-working device, comprising:
   a frame,
   a saw apparatus mounted to the frame;
   a feed mechanism configured to feed the at least one stem relative to the frame, wherein the feed mechanism comprises:
   opposing feed arms, each feed arm pivotally connected to the frame, wherein each feed arm comprises a pivot pin arrangement, the pivot pin arrangement comprising:
   a first pivot pin pivotally connected to the frame;
   a second pivot pin pivotally connected to the frame;
   wherein the first pivot pin and the second pivot pin are aligned along a common longitudinal axis; and
   wherein an air gap is provided between the between the first pivot pin and the second pivot pin along the common longitudinal axis.

2. The timber-working device of claim 1, wherein each feed arm comprises a feed arm frame comprising a first pivot pin mounting portion and a second pivot pin mounting portion.

3. The timber-working device of claim 2, wherein the feed arm frame comprises a motor mounting portion.

4. The timber-working device of claim 3, wherein the feed arm frame comprises a first side portion between the motor mounting portion and the first pivot pin mounting portion, and a second side portion between the motor mounting portion and the second pivot pin mounting portion.

5. The timber-working device of claim 4, wherein the feed arm frame comprises a posterior portion between the motor mounting portion, the first side portion, and the second side portion.

6. The timber-working device of claim 2, wherein the feed arm frame comprises a superior bridge portion between the first pivot pin mounting portion and the second pivot pin mounting portion.

7. The timber-working device of claim 6, wherein the superior bridge portion is provided on an anterior side of the first pivot pin mounting portion and the second pivot pin mounting portion.

8. The timber-working device of claim 4, wherein the feed arm frame comprises a bracing bridge portion between the first side portion and the second side portion, provided inferior to the first pivot pin mounting portion and a second pivot pin mounting portion.

9. The timber-working device of claim 8, wherein the feed arm frame comprises a posterior portion between the motor mounting portion, the first side portion, and the second side portion, and wherein the bracing bridge portion comprises a bent plate extending from the posterior portion in an anterior direction, and bending in an inferior direction.

10. The timber-working device of claim 6, wherein the feed arm frame comprises at least one gusset portion between the superior bridge portion and the first pivot pin mounting portion and the second pivot pin mounting portion, respectively.

11. The timber-working device of claim 10, wherein the gusset portions are offset from the first side portion and the second side portion, respectively.

12. The timber-working device of claim 2, wherein the feed arm frame comprises at least one doubler portion across the air gap.

13. The timber-working device of claim 12, wherein the feed arm frame comprises:

a first pivot pin mounting portion and a second pivot pin mounting portion;

a motor mounting portion;

a first side portion between the motor mounting portion and the first pivot pin mounting portion;

a second side portion between the motor mounting portion and the second pivot pin mounting portion; and a posterior portion between the motor mounting portion, the first side portion, and the second side portion, wherein the feed arm frame comprises a first doubler portion on the posterior portion.

14. The timber-working device of claim 12, the feed arm frame comprises:

a first pivot pin mounting portion and a second pivot pin mounting portion; and a superior bridge portion between the first pivot pin mounting portion and the second pivot pin mounting portion, wherein the feed arm frame comprises a second doubler portion on the superior bridge portion.

15. The timber-working device of claim 6, wherein the feed arm frame comprises a superior strong-back portion between the superior bridge portion, the first side portion, and the second side portion.

16. The timber-working device of claim 15, wherein the superior strong-back portion is perpendicular to the superior bridge portion.

17. The timber-working device of claim 4, wherein the feed arm frame comprises an inferior strong-back portion between the motor mounting portion, the first side portion, and the second side portion.

18. The timber-working device of claim 17, wherein the inferior strong-back portion is perpendicular to the motor mounting portion.

* * * * *